April 13, 1943.    G. KEINATH    2,316,253
METHOD AND MEANS FOR TESTING MATERIALS
Filed July 18, 1938    3 Sheets-Sheet 1

INVENTOR
George Keinath

April 13, 1943. G. KEINATH 2,316,253
METHOD AND MEANS FOR TESTING MATERIALS
Filed July 18, 1938 3 Sheets-Sheet 2
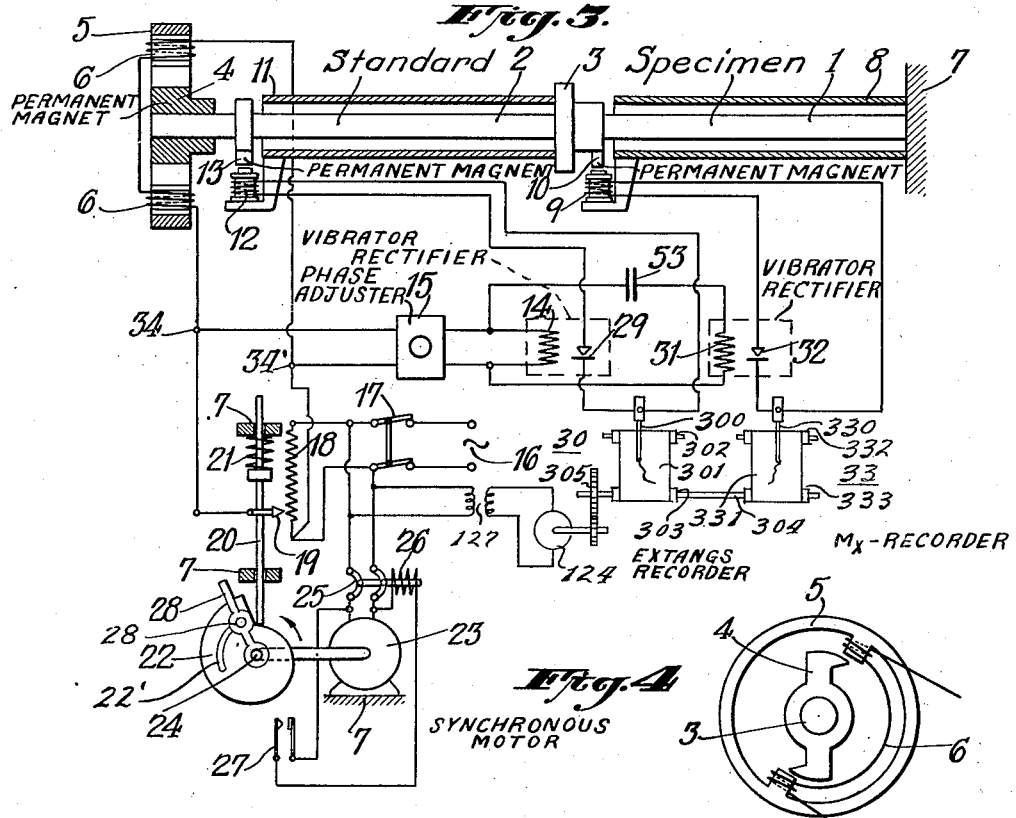
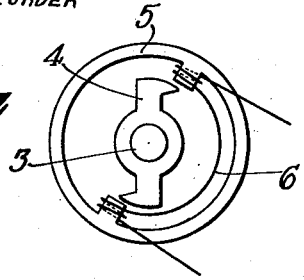
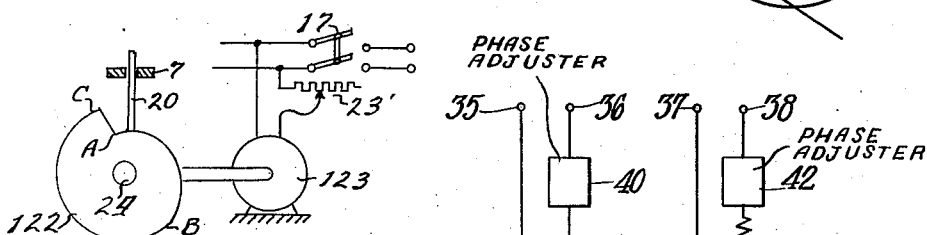
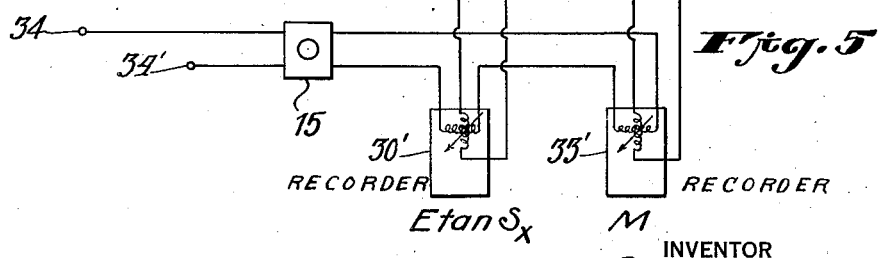
INVENTOR
George Keinath
BY
his ATTORNEYS

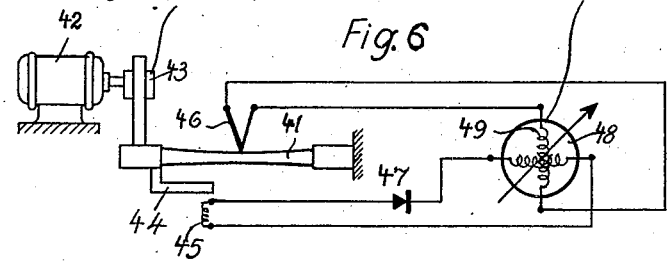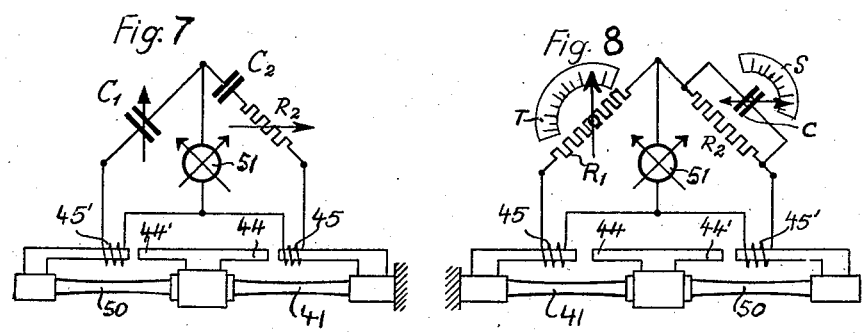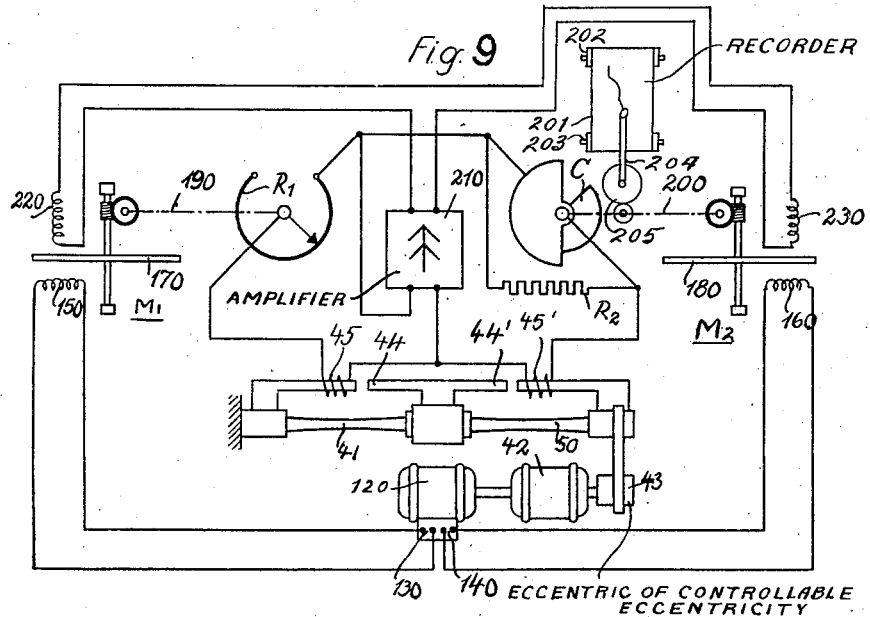

Patented Apr. 13, 1943

2,316,253

UNITED STATES PATENT OFFICE 2,316,253

METHOD AND MEANS FOR TESTING MATERIALS

George Keinath, Larchmont, N. Y.; vested in the Alien Property Custodian

Application July 18, 1938, Serial No. 219,919
In Germany July 17, 1937

25 Claims. (Cl. 73—51)

(Granted under the provisions of sec. 14, act of March 2, 1927; 357 O. G. 5)

My invention relates to methods and means for testing materials with the aid of oscillatory testing machines. For determining the oscillatory and fatigue properties of materials or structural elements, oscillatory testing machines are, as a rule, employed wherein a specimen of the material is subjected to continuous alternating stresses. These tests usually are made as follows:

The machine is at first adjusted to impart a predetermined stress to the specimen. Then $10^6$ to $10^7$ load alternations at this adjusted stress are applied. If the specimen is destroyed before the end of $10^6$ alternations, a new one is inserted and the test is repeated while the stress is adjusted to a lower step. If, however, the specimen endures $10^6$ oscillations without breaking, the stress is increased by one step and the same specimen is again subjected to $10^6$ load alternations. These tests must be made with several test pieces, in order to determine the maximum load at which the test piece is capable of just enduring $10^7$ oscillations.

This known method is rather cumbersome and time-consuming. It therefore has been suggested to resort to short-time tests during which the stress acting on the test piece is increased by hand. Each stress is applied a certain time during which the necessary measurements are taken. Then the load is increased by one step and the reading of the measurements repeated, etc. In this way, the damping curve and the deformation of the specimen are ascertained for different stresses, and the resulting data of the dependency of the damping and the deformation upon the load are used for drawing a conclusion as to the permanent strength or creep strength of the material.

This method also has a number of disadvantages. The stepwise increase of the load and the interruptions necessary for taking the measurements may have the result that the material is "trained." It is known that at a slow and stepwise increase of the stress in a material, a structural change may take place which effects an increase in permanent strength. The strength determined by such tests, therefore, is greater than the strength which exists if, while applying the same loads, the stress is increased continuously or in only short-lasting intervals. It further has been observed that during the increase of load, desultory changes in the mechanical properties of the test piece may occur. Such leaps in the mechanical properties of the specimen, in general cannot be ascertained by employing a stepwise and unsteady increase of the load by hand and by pointwise reading off the measurements, although such irregularities in the properties of the specimen are of fundamental importance for judging the material.

An object of my invention is to make it possible to ascertain fatigue characteristics of materials by a test which does not necessitate destroying the specimen to be tested and, more in particular, to test work pieces, such as crank shafts, before their assemblage.

An object of my invention, further, is to shorten the time required for executing fatigue tests with oscillatory testing machines without loss in reliability of the test results.

Another object aimed at by my invention consists in enabling the ascertaining of desultory changes in the mechanical properties of fatigue-tested materials.

A still further object is to facilitate the measuring and to ensure uniformity of the timely distribution of the stresses applied to test pieces in oscillatory testing machines in order to improve the reliability and to ensure comparableness of the test result.

Other objects of my invention will become apparent in the course of the following description.

According to my invention a fatigue test of materials by subjecting specimens of the material to oscillatory stresses is carried out by steadily increasing the oscillatory load and by simultaneously effecting a continuous recording of the determinants of the elastic properties of the specimen, especially of its modulus of elasticity (Young's Modulus) and its internal damping as manifested by the loss angle ($\delta$) or the loss factor (tan $\delta$) of the material. The meaning and significance of the just-mentioned determinants are apparent from the following. A perfectly elastic body could be subjected to oscillatory deformations without energy being lost by internal friction within the body. Such ideal elasticity, however, does not occur in technical materials so that when a specimen is subjected to deformation, a certain portion of the energy employed for effecting the deformation is always dissipated by internal friction within the specimen. This internal loss of energy is what I mean by the term "internal damping." Another expression designating the same phenomenon is the term "attenuation" which is often employed in analogy to the corresponding term used for describing a similar phenomenon in electric alternating current circuits. When a test rod is subjected to deformation by a periodically acting force, coincidence of phase between the force and the deformation is at first present at any cross section spaced from the point of attack of the force, so long as the deformation remains below the elastic limit of the material. A phase displacement between the periodical force and the deformation caused thereby, occurs, however, as soon as the elastic limit is attained. This phase displacement, similar to electrical nomenclature, may be considered as a mechanical "loss angle" and represents a measure for the internal damping. A convenient way of numerically expressing the loss angle ($\delta$) is to use the tangent (tan $\delta$) of this angle. When speaking of the "loss factor" ($k$) of a material, I wish to have this expression understood as a synonym of "tan $\delta$", as explained in the foregoing. According to my invention, the above testing, preferably, is completed in such a way that after a given maximum load is reached, this oscillatory load is kept constant while the recording of the determinants, in particular of the modulus of elasticity and the loss factor, is continued.

Oscillatory tests thus may afford within a short testing period a set of curves, the evaluation of which yields a characterization of the strength of the material tested. The way in which this result is obtained will become more apparent from the following explanation of the accompanying drawings in which Fig. 1 shows a set of curves referring to the test results of a certain specimen, and Fig. 2, a comparative set of other curves indicating the properties of the same specimen at different load conditions; while Fig. 3 exemplifies a test arrangement suitable for carrying out tests according to the invention, the rod-shaped specimen, a standard rod and the testing device being shown in a part-sectional side elevation, and Fig. 3a shows a modified form of a portion of the same test arrangement.

Fig. 4 illustrates the mechanical part of the arrangement of Fig. 3 in front elevation.

Fig. 5 shows a variant of the measuring portion of the arrangement of Fig. 3.

Fig. 6 illustrates an arrangement according to the invention which is especially designed for determining the ratio between the increase in temperature and the speed of deformation of the test piece.

Figs. 7 and 8 give examples of arrangements for determining the components of the speed of deformation, and Fig. 9 shows a complete recording arrangement based on the principle of Fig. 8.

Figure 1:
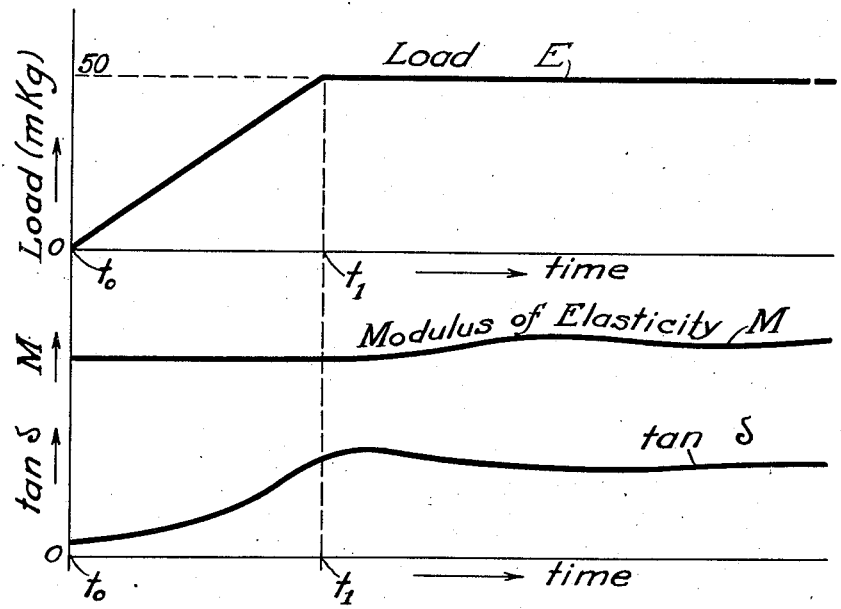

Referring at first to Fig. 1, it is assumed that the specimen of the material to be tested is placed in an oscillatory testing machine of any known type, which, as required by the present invention, is provided with a device for gradually increasing the load oscillatorily applied to the test piece. This control device may be actuated by means of an auxiliary motor running with constant speed and effecting a gradual increase of the load from the zero or another minimum value up to a predetermined maximum load. This maximum load is kept constant, for instance by stopping the auxiliary motor, while the oscillations continue. This course of the load variation is apparent from the curve E shown in the upper portion of Fig. 1. The test starts at the time $t_0$. Now the load starting from the zero value is increased proportionally with the passing time until at the moment $t_1$ a maximum torque, for instance of 50 meter kilograms, is reached. From now on, this torque remains constant. During the whole testing period, the modulus of elasticity M and the energy loss within the material characterized by the damping effect or the loss factor tan $\delta$, are continuously recorded. The record furnishes characteristic curves, for instance such as shown in the lower portion of Fig. 1. These curves indicate that during the increase of the torque from zero to 50 m. kg., the modulus of elasticity M of the particular specimen under observation remains practically constant, while the loss factor tan $\delta$ shows a steady increase. After reaching the 50 m. kg. mark, the modulus M shows a slight increase caused by a structural strengthening of the material due to the permanent stressing. During the same period, the loss factor decreases to a slightly lower value.

Figure 2:
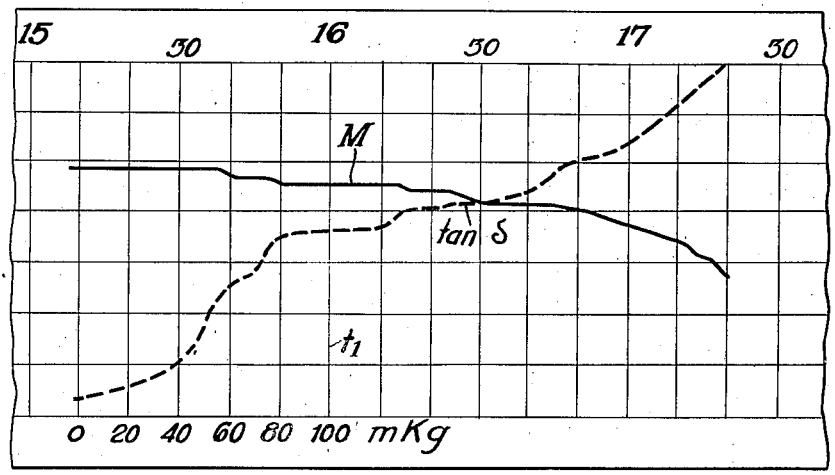

Fig. 2 represents two recording strips as used in common recording instruments traced in one. The strip indicates the curves M and tan $\delta$ of the same specimen as represented by Fig. 1, except that now the load is increased to 100 m. kg. as indicated at the lower left-hand portion of the strip. Upon exceeding a load of about 60 m. kg., the modulus of elasticity suddenly drops, while at the same time the loss factor shows a sudden increase. This indicates that the material has suffered an overstress. During the further increase of the load, other desultory changes in the course of the two curves M and tan $\delta$ occur, and during the maintaining of a constant load of 100 m. kg. the modulus continues dropping and the loss factor continues climbing until breaking of the specimen.

After curves of such type, with respect to the particular material to be tested, are known, they enable determining the strength properties of other specimens of this material from a comparison of the curves of the specimen which are recorded while the oscillatory load is kept below a dangerous value so that a destruction of the specimen is avoided. The invention thus is also appropriate for making short-time tests on finished work-pieces and structural elements.

While according to the foregoing the curves of the determinants M and tan $\delta$ are taken in dependence upon a continuously increased load, the invention may also be carried out by similarly controlling another magnitude upon which the elastic properties are dependent. Thus instead of controlling the force or the moment acting on the test piece, the deformation to which it is subjected can be gradually increased. Other ways of carrying out the invention consist in gradually increasing the frequency of the oscillations or the temperature of the test piece. The latter method may be performed by employing additional heating means or by utilizing the natural increase and the reaching of a permanent value of the temperature in the test piece. The particular method suitable for a given case depends on the material to be tested, the working conditions to which it is to be subjected, and the type of test apparatus available. Therefore, some different examples are given in the following:

In bending machines, i. e. testing devices wherein the speciment is subjected to bending stresses, the position of the usual loading poise may be changed by means of an auxiliary motor so as to effect a load increase of the type shown by curve E in Fig. 1. In vibratory machines, the method according to the invention may also be employed by providing the driving motor with a speed regulator, and by increasing the speed during the testing operation. In testing machines having a crank or eccentric for applying torsional stresses to the test piece, means are applicable for varying the effective length of the crank arm or the eccentricity of the eccentric by means of an auxiliary control motor.

If the invention is to be performed by steadily increasing the deformation of the test piece, different means are available, depending upon the construction of the testing machine: In the case of a bending machine, means including an auxiliary motor may be employed for gradually increasing the bending angle, for instance through a relatively rigid spring serving for measuring the effective force. In the case of torsional testing machines, the torsional angle may be increased by gradually diminishing the damping effect of additional damping means containing, for instance, a regulatable cylinder damper or a vane coacting with a damping liquid. In machines with an electric control device operating with contacts, the position of the control contacts may be varied by means of an auxiliary motor.

In electromechanically energized resonance machines, the feed-back degree may be varied by means of a series resistance, or a phase adjuster may be provided for varying the phase position of the energization.

An advantageous arrangement for carrying out tests according to the invention is shown in Figs. 3 and 4. In these figures, 1 denotes a rod-shaped specimen to be subjected to torsional stresses. One end of rod 1 is securely clamped to the stationary body 7 of the machine. The other end is secured in an armature 3 which connects the specimen in series with a standard rod 2. This standard rod has a known modulus of elasticity and a damping or energy loss of negligible or known value; certain known aluminum alloys may be used for this purpose. On the other end of standard rod 2 a permanent magnet armature 4 is secured which is arranged in a magnet system 5 having an energizing coil 6. A rigid steel tube 8 or an equivalent stationary holder is secured to the body 7 of the machine and carries a magnet coil 9. A magnet 10 secured to armature 3 cooperates with coil 9 so as to generate in the coil a voltage having an amplitude in proportion to the relative amplitude of the deflection between 9 and 10. A rigid tube 11 fixed to armature 3 carries a coil 12 cooperating with an armature magnet 13 clamped to rod 2 so as to similarly generate a voltage in coil 12 in proportion to the deflection between 12 and 13.

The magnetic device comprising parts 4, 5 and 6 serves for imparting torsional oscillations to the test series arrangement of standard and test rods and is designed to effect a magnetic moment and accordingly an amplitude of the torsional oscillations in proportion to the energy acting in coil 6. The energizing network of this coil is built up as follows. An alternating current source 16 having the test frequency is connected to coil 6 through a main switch 17 by means of a voltage divider 18. The voltage divider has a slide contact 19, the energization of coil 6 and therewith the load applied to the test piece being dependent upon the position of this contact. The contact is secured to a slide bar 20 which is provided with spring means 21 tending to hold the bar against a cam 22. The cam is connected with an auxiliary motor 23, for instance a synchronous motor, the connection being indicated by a shaft 24 although it may be devised in any other suitable way. Motor 23 is connected through a releasable switch 25 with the current source 16, the tripping coil 26 of switch 25 being connected with the supply leads of motor 23 through an end switch 27 which usually maintains its contacts in open position. An abutment 28 of cam 22 serves for closing switch 27 at the end of the movement of the cam.

The arrangement described so far operates as follows: After having properly inserted the test rod 1, both switches 17 and 25 are closed, the cam 22 being in the position illustrated. Now the magnet system 5 is energized by alternating current and the rods 2 and 1 are subjected to oscillatory stresses of equal torque. At the same time the auxiliary motor 23 starts moving and rotates cam 22 in the direction indicated by an arrow. Cam 22 moves slide bar 20 and contact 19 upwards against the action of spring 21. Thereby the voltage divider 18 is gradually adjusted so as to cause a proportional increase of the torsional load acting on rods 2 and 1. The curvature of cam 22 is designed in such a manner as to effect the desired change in the increase of the load, for instance, according to curve E in Fig. 1. At the end of the first testing period corresponding to the time between $t_0$ and $t_1$, the abutment 28 actuates the end switch 27 and causes coil 26 to trip switch 25. Now the auxiliary motor 23 is stopped while the magnetic system 5 continues to be energized.

The speed of motor 23, or the position of abutment 28 on cam 22 may be made adjustable in order to vary the testing conditions. In the embodiment shown in Fig. 3, for instance, the abutment 28 is adjustable and may be fixed in the desired position by means of an adjusting screw 28' passing through a slot 22' of cam 22. Besides or instead, cam 22 may be exchangeable for cams with different curvatures, or the curvature may include a constant portion corresponding to the testing period beyond time point $t_1$, so that the end switch 27 and the switch arrangement 25, 26 may be dispensed with. A modification of the last-mentioned kind is shown in Fig. 3a. The motor 123 is provided with a speed-adjusting rheostat 23' and the cam 122 has a cam surface composed of a spiral portion, extending between points A and B, and a circular portion BC which runs concentrically with respect to the axis of rotation. Curve portion AB corresponds to curve E in Fig. 1 between $t_0$ and $t_1$, and curve BC corresponds to the constant portion of E beyond $t_1$ in Fig. 1.

While the aforedescribed load variation is effected, the determinants of the elastic properties of the test rod are continuously recorded. The means for effecting these recordings shown in the present embodiment, are the following. The exciting coil 14 of a vibrating reed rectifier 29 is connected to the input leads of coil 6 through a phase regulator 15. Coil 12 is connected through rectifier 29 with a direct current recording instrument 30. Similarly the exciting coil 31 of another rectifier 32 of the vibrating reed type is connected with phase regulator 15, a condenser 53 being arranged in the circuit so that coil 31 is energized in 90° phase displacement as compared with coil 14. Rectifier 32 is series connected with coil 9 and a second direct current recording instrument 33. The operation of these elements will be explained in a later paragraph.

If for recording the loss factor and the modulus of elasticity, instruments are used, the paper transport of which is effected by means of a clockwork or a motor of constant speed, it is as a rule desirable that the values of the load acting on the test piece be indicated on the time scale of the recording paper, as shown in Fig. 2, so that the dependence of the recorded determinants upon the load is readily apparent. Such a way of recording is used on the recording strip illustrated in Fig. 2. In order to obtain a record of this kind, means may be provided for ensuring that the moving speed of the recording paper is proportional to the speed of the auxiliary motor effecting the increase of the load. Any suitable means for transferring the movement of the auxiliary motor 23 to the paper transporting device of the recorders or for maintaining the recorder speed in constant relation to the motor speed, are applicable. A simple way, for instance, is to design the auxiliary motor and the motor for transporting the recording paper as synchronous motors and to connect them to the same alternating current source. Such an arrangement is illustrated in Fig. 3 as follows. Each recorder 30 and 33 having a measuring mechanism 300 or 330 coacting with a recording paper 301 or 331, is provided with a roller 302 or 332 carrying a supply of paper tape, and a transport roller 303 or 333. The supply rollers are acted upon by some braking device (not shown) so that the recording paper is kept taut while being wound on the roller 303 or 333. The rollers 303 and 333 are connected by a shaft 304 and are simultaneously actuated by means of an intermediate gear 305, or the like, with the aid of a synchronous motor 123. The motor 123 is connected through a transformer 124 with the leads feeding the synchronous motor 23, so that the speed of the paper transport in the recorders 30 and 33 is always in proper proportion to the speed of the change of load effected by the auxiliary motor 23.

The measuring system above described is adjusted and operates as follows. After having started the oscillatory stressing of the material, but before taking the measurements, phase adjuster 15 is so regulated that the pointer of recorder 30 indicates zero, a negligible damping loss of the standard rod 2 being assumed. When now starting the testing proper, the indications of recorder 30 correspond to E·tan δ, wherein E represents the stress or torque applied and tan δ the loss factor to be determined. The result is a curve corresponding, for instance, to curve tan δ in Fig. 2, which by employing a special gauge allows reading off the damping factor. At the same time, recorder 33 indicates a value which is in proportion to the modulus of elasticity M of the specimen, for instance as manifested by curve M in Fig. 2.

The just-mentioned measuring operation will be more thoroughly understood from the following consideration. The magnitude M is a measure for the elastic deflection of the specimen subjected to oscillatory stresses, this deflection occurring without energy loss since only the reactive elasticity is stressed. The magnitude E·tan δ is a measure for the permanent deformation or the active energy loss in the material. The resultant oscillatory stress exerted on the material thus is composed of an active and a phase-displaced reactive component in the same way as an alternating electric voltage can be analyzed by determining its active (watt) and reactive (wattless) components, both being phase-displaced with respect to each other. Accordingly, the measuring means shown in Fig. 3 are built up in a way similar to an electric measuring system for determining the electric capacity and the internal loss (loss factor) of a condenser (comparable with specimen 1) by connecting it with a standard condenser (comparable with standard 2) and subjecting both condensers to the same alternating voltage in much the same way as in the present electromechanical device, both the specimen 1 and the standard 2 being subjected to the same oscillatory torque. This torque is synchronous with and proportional to the alternating voltage supplied through phase-adjuster 15 to the exciting coils 14 and 31 of the rectifiers 29 and 32 respectively, and since both coils 14 and 31, due to condenser 53, are operated with a phase difference corresponding to that of the active and reactive magnitudes to be determined, it is apparent that by properly regulating the phase adjuster 15, the closing intervals of rectifiers 29 and 32 may be so adjusted that each rectifier is in current-carrying condition just at the proper time to have the appertaining recorder 30 or 33 respond to the magnitude to be indicated.

It has already been mentioned that the measuring arrangement resembles the electric measuring networks for determining the capacity and the loss factor of condensers, the standard rod 2 corresponding to the standard capacity, and the specimen 1 to the condenser to be measured. In this analogy, the modulus of elasticity M and the loss angle δ correspond to the reciprocal value of the dielectric constant and to the electric loss angle respectively, the mechanical torque to the electric voltage, and the amplitude of the elastic deformation to the charge and discharge current of the condenser. Damping and modulus ascertained by the testing machine thus are comparable with the active and the reactive voltage components determining the condenser properties in the analogue electric circuit. In pursuit of this analogy it is evident that numerous modifications of the exemplified arrangement are possible similar to the various modifications known in electric measuring arrangements for determining the active component and the reactive or wattless component of an alternating current magnitude. One of these modifications, following from the above analogy, is shown in Fig. 5.

The network shown in Fig. 5 may be used to replace the recording portion of the arrangement shown in Fig. 3. Terminals 34 and 34' are to be connected to the equally indicated points in Fig. 3; terminals 35 and 36 are to be connected to coil 12; and terminals 37 and 38 to coil 9. 30' and 33' are wattmetric measuring instruments designed as recorders. The current coils of both instruments are series connected with phase adjuster 15. The voltage coil of recorder 30' is connected to terminals 35 and 36 through a condenser 39 and a phase adjuster 40. The voltage coil of recorder 33' is connected with terminals 37 and 38 through a resistance 41 and a phase adjuster 42. Before starting the test, the phase adjusters in this network are so regulated that recorder 30' indicates zero and recorder 33' a maximum value, and then the test method is effected in the same way as described with relation to Fig. 3 and affords the same results.

While in the preceding description a standard rod is assumed, the damping of which is negligible, the measuring may also be effected when employing a standard rod having a small damping of known value. This value is to be added to that determined for the specimen, or the phase position of the current energizing the rectifiers or the wattmetric current coils may be adjusted to a value corresponding to the actual damping of the standard rod.

The arrangement shown in Fig. 6 serves to determine the ratio between the increase of temperature of a specimen during a permanent test and the speed of deformation by employing a quotient measuring instrument. In order to elucidate this and the embodiments later described, some remarks with reference to the prior art may be made.

The loss factor or attenuation factor (tan $\delta$ or $k$) may be expressed as a ratio $k=D/A$, where D is the work dissipated in the test piece during a load alternation and A is the work of deformation necessary in attaining the maximum value of the amplitude of the test piece.

If test pieces of equal, for instance circular, cross-section are employed, $k$ is a constant factor which depends upon the material of the specimen but is independent of the dimensions of the specimen and, as tests have shown, also independent of the frequency of the stresses applied to the specimen. The factor $k$ of a given material varies only in dependence upon the magnitude of deformation, i. e. upon the maximum value of the amplitude of the test piece and upon the kind of load, for instance, torsional, tensile, compressive or bending stresses. The attenuation factor $k$ has hitherto been exclusively determined by computation. When employing resonance machines for testing oscillations, for instance, the dying-out curve may be plotted and the factor $k$ may be derived from the logarithmic decrement. The hysteresis loop may also be recorded through a mirror arrangement and the factor $k$ may be derived from the area of the loop and of the stress of the specimen. Since the specimen is heated during the oscillation test, owing to the work done upon it, the change in temperature occurring during the permanent test may be measured and from this change and the stress of the specimen the attenuation factor may be derived. Another method for determining the attenuation is based upon the fact that the work dissipated in the specimen must be produced by the driving motor of the testing machine. The power of the driving motor is then determined as well as the stress of the specimen, and the factor $k$ is derived therefrom.

These known methods for determining the attenuation factor are very complicated and furnish inaccurate results owing to the unavoidable inaccuracies when measuring the individual magnitudes and when computing. The method according to the invention removes these drawbacks and moreover ensures a continuous reading off and an automatic recording of the test readings.

This is accomplished according to the invention by the fact that, similar to the method above explained with reference to Fig. 3, two electrical magnitudes are formed, one of which corresponds to the amount of the attenuation losses occurring in the specimen or to a magnitude dependent upon the losses, and the other corresponds to the stress of the test pieces, or to a magnitude depending upon the stress, and that in departure from the principle of the aforedescribed embodiments the ratio of the two electrical magnitudes is measured or caused to be indicated.

The method may be carried out in different ways, since for measuring the losses as well as for measuring the stress of the test piece various magnitudes may be taken into consideration. The losses, for instance, as already above mentioned, may be determined by the increase in temperature of the oscillating test piece. Further magnitudes which depend upon the work done are the change in permeability, the watt component of the speed of deformation referred to the force of deformation, and the wattless component of the amplitude of deformation referred to the force of deformation. The magnitudes derived from the stress of the test piece are, for instance, the force of deformation, the speed of deformation and the wattless component of the speed of deformation referred to the force of deformation.

In determining the ratio of the two electrical magnitudes, one of the known methods may be employed. Thus both electrical magnitudes may be caused to act on each testing circuit of a quotient measuring instrument, for instance, of a crossed-coil measuring instrument. In the present case where a magnitude corresponding to the modulus of elasticity is to be recorded besides a magnitude corresponding to the loss factor, bridge or other compensating circuits are, however, particularly suitable, since in this manner as components of a measuring voltage two electrical magnitudes of 90° phase displacement may be obtained, one of which corresponds to the modulus of elasticity and the other to the loss of attenuation.

In the embodiment shown in Fig. 6, it is assumed that a test rod 41 is clamped at one end and set into torsional oscillations at the other end with the aid of an eccentric 43 driven by a motor 42. To the test rod 41 is connected an alternating current generator which is schematically shown in the drawing by a magnet 44 connected to the oscillating end of the test rod and by a fixed winding 45 influenced by the magnet 44. When the rod oscillates, an alternating voltage is produced in the winding 45, the magnitude of which corresponds to the speed of deformation.

To measure the heat produced in the test rod, a thermo-couple 46 is connected to the rod, the thermo-couple producing a direct voltage corresponding to the difference in temperature between the rod and its surrounding; the direct voltage is therefore a measure of the losses of attenuation.

The winding 45 is connected through a rectifier 47 to a test circuit 48 of a crossed-coil instrument, in the other test circuit 49 of which is inserted the thermo-couple 46. In this manner the ratio between two direct voltages is measured, one of which corresponds to the losses of attenuation and the other to the speed of deformation so that the deflection of the pointer of the crossed-coil instrument is a measure of the attenuation factor $k$. The arrangement may be operated in a manner similar to that aforedescribed with reference to Fig. 3, i. e. the amplitude of the oscillations may at first be gradually increased up to a predetermined value and then kept constant at this value.

In the embodiments shown in Figs. 7, 8 and 9, it is assumed that a reference rod 50 is coupled with the test rod 41, both rods being set into oscillation by a motor (not shown) in the same way as described above. To the oscillating ends of both rods are connected alternating current generators which are indicated in the drawing by magnets 44 and 44' respectively connected to the oscillating ends of the rods and by corresponding fixed windings 45 and 45', respectively. The arrangements are so designed that the alternating voltage produced in the winding 45 corresponds to the speed of deformation of the test rod 41, and that the voltage produced in the winding 45' corresponds to the speed of deformation of the reference rod 50 practically free of losses. Since this voltage depends upon the difference between the oscillations of the two extreme rod ends, the winding 45' is carried by the outer end of rod 50, whereas the corresponding magnet 44' is connected to the outer end of rod 41.

In Fig. 7, the windings 45 and 45' are each arranged in a branch of a compensating circuit. Series connected to the winding 45 is a capacitor $C_2$ and a rheostat $R_2$. A regulatable capacitor $C_1$ is series connected to the winding 45'. A vibration galvanometer 51 is schematically indicated in the zero branch as a zero instrument.

The voltage produced by the reference rod is $E_0$, and the voltage produced by the test rod amounts to $E_1+jE_2$. In this case $E_2$ is proportional to the stress (wattless component of the speed of deformation referred to the force of deformation) and $E_1$ is proportional to the loss of attenuation (watt component of the speed of deformation referred to the force of deformation). The connection may be now balanced with the aid of the impedances $C_1$, $C_2$ and $R_2$. As may be easily proved, the zero instrument shows no deflection if $k=E_1/E_2=\omega C_2 R_2$. In this case, $\omega$ is the circular frequency corresponding to the oscillations. Furthermore, $E_1=E_0 C_1/C_2$.

If the compensating circuit is balanced, the magnitude of the resistance $R_2=k/\omega C_2$, and varies with the attenuation factor $k$ if the circular frequency $\omega$ and the capacitance $C_2$ are maintained constant. By varying the capacitor $C_2$, the sensitiveness of the measurement may be changed if desired.

It follows from the equation $E_1=E_0 C_1/C_2$ that $C_1=E_1 C_2/E_0$. Since the voltage $E_0$ produced by the oscillations of the reference rod is practically constant, the adjustment of the capacitor $C_1$ is at the same time a measure of the stress and can therefore be calibrated in kg./mm.$^2$.

Fig. 8 shows a modified form of the compensating circuit in the manner that a rheostat $R_1$ is series connected with the winding 45 and a resistor $R_2$ connected in parallel relation to the regulatable capacitor C is connected in series with the winding 45'. In this case the following equations apply to the zero balance:

$$k=E_2/E_1=\omega C R_2$$

and $$E_1=E_0 R_1/R_2$$

The regulatable capacitor C may then be directly provided with a scale S which indicates the factor $k$. $R_1$ is a measure of the stress and its scale T may be calibrated in kg./mm.$^2$.

If the magnitudes to be measured are to be continuously indicated or recorded, the arrangement may be so designed that the zero instrument effects in a manner well known the automatic balance of the compensation circuit through a bolometric, inductive and photo-electric amplifying arrangement. To this end an arrangement as shown in Fig. 9 is preferably employed. The operation of this arrangement will be clear, in conjunction with the following description, from the aforementioned similarity to the well-known systems for measuring the capacity and the loss factor of electrical condensers.

In Fig. 9 the motor 42 which sets into oscillation the rods 41 and 50 by means of the eccentric 43 is connected to a generator 120 provided with two windings for producing an alternating two-phase current so that from the terminals 130 and 140 respectively, two alternating voltages may be taken whose frequency coincides with that of the oscillations of the test piece and which are 90° phase displaced with respect to each other. These voltages feed the voltage coils 150 and 160, respectively, of an induction meter $M_1$ and $M_2$, respectively. The armature 170 of the instrument $M_1$ is coupled through a transmission 190 with the slide contact of the rheostat $R_1$. The armature 180 of the other instrument $M_2$ is connected through a transmission 200 with the movable electrode of the regulatable capacitor C. The compensating circuit corresponds substantially to the arrangement shown in Fig. 8, except that a tube amplifier 210 is arranged in the zero branch, the output circuit of the amplifier being connected with the current coils 220 and 230 of the induction measuring instruments $M_1$ and $M_2$.

The arrangement shown in Fig. 9 thus forms a self-balancing compensator in which the automatic balance is effected by two wattmetric zero motors, i. e. by reversible motors which constitute phase-responsive zero instruments and at the same time adjust the balancing impedances. In this manner it is possible to read off from correspondingly calibrated scales the attenuation factor $k$ in accordance with the adjustment of the capacitor C and at the same time the stress in accordance with the adjustment of the resistor $R_1$. The movable members of the impedances C and $R_1$ may be connected to the recording devices in order to automatically record the magnitudes under consideration. One of these recording devices is illustrated in Fig. 9. The device contains two transport rollers 202 and 203 for accommodating and moving a recording sheet 201 and a recording pen 204 coupled through a gear 205 with the axle 200 of the movable condenser member so as to register a curve on sheet 201 in accordance with the movements of the reversible driving mechanism $M_2$. The recorder of resistor $R_1$ may be arranged in a similar manner.

I claim:

1. In an arrangement for testing materials, a testing machine for subjecting a test piece to an oscillatory load, a device associated with the testing machine for uniformly regulating said load, a motor connected with said regulating device for gradually increasing said load, electric means associated with said test piece for producing two phase-different electric magnitudes proportional to the elasticity and the internal losses respectively of said test piece, means for automatically recording said electric magnitudes, and a device for stopping said motor upon the attainment of a predetermined maximum value of the load below the value of permanent deformation.

2. In an arrangement for testing materials, a testing machine for subjecting a test piece to an oscillatory load, a device associated with said machine for varying said load, a motor operating at a uniform speed and connected with said device so as to cause said device to gradually increase said load up to a given maximum load below the magnitude of permanent deformation, electric means associated with said test piece for producing two phase-different electric magnitudes proportional to the elasticity and the internal losses, respectively, of said test piece, measuring means for recording said electric magnitudes, said measuring means comprising a recording system having a movable recording surface, and driving means for moving said recording surface at a uniform speed.

3. In an arrangement for testing materials, a testing machine for subjecting a test piece to an oscillatory load, a device associated with said machine for varying said load, a motor for actuating said device so as to gradually increase said load up to a predetermined maximum load, electric means associated with said test piece for producing two phase-different electric magnitudes proportional to the elasticity and the internal losses, respectively, of said test piece, measuring means for recording said electric magnitudes, said measuring means comprising a mechanism for transporting a recording sheet during the recording operation with a speed proportional to that of said motor, and means for stopping said device from further increasing said load upon said load reaching a given magnitude below the limit of permanent deformation.

4. In an arrangement for testing materials, a testing machine for subjecting a test piece to an oscillatory load, means associated with said machine for producing an alternating current dependent upon the speed of deformation of the test piece, a thermo-couple arranged to be responsive to the temperature of said test piece, and an electric recording measuring system connected with said current-producing means and said thermo-couple for recording the voltages produced by said means and said thermo-couple.

5. In an arrangement for testing materials, a testing machine for subjecting a test piece to an oscillatory load, means associated with said machine for producing an alternating current dependent upon the speed of deformation of the test piece, a thermo-couple arranged to be responsive to the temperature of said test piece, and an electric measuring system having a quotient-measuring instrument connected with said current-producing means and said thermo-couple so as to continuously indicate the quotient of the voltages produced by said means and said thermo-couple.

6. In an arrangement for testing materials by determining the properties of a test piece in comparison with a standard piece, in combination, means for imposing similar and simultaneous oscillatory stresses on said test piece and said standard piece, means for producing an alternating voltage depending upon the speed of deformation of said test piece and another alternating voltage depending upon the speed of deformation of said standard piece, and an electric indirectly-indicating measuring circuit connected with said two voltage-producing means and containing adjustable compensating means for balancing said two voltages.

7. In an arrangement for testing materials, in combination, a testing machine for supplying similar and simultaneous oscillatory stresses to a test piece and to a standard piece of known properties, an electromagnetic device associated with said machine so as to produce an alternating voltage in correspondence with the oscillations of the test piece, a second electromagnetic device associated with said machine so as to produce an alternating voltage in correspondence with the oscillations of the standard piece, and a self-balancing measuring system connected with said two devices so as to compensate one of said two voltages by the other when in balanced condition.

8. In an arrangement for testing materials by comparing the properties of a specimen of the material with a standard piece of known properties, in combination, a device for subjecting said standard piece and said specimen to oscillatory stresses, means associated with said testing device for producing a voltage in correspondence with the oscillatory deformation of the standard piece and another voltage in correspondence with the oscillatory deformation of the specimen, a balanceable measuring network having two circuits interconnected by a common zero branch, said circuits being connected with said voltage-producing means so as to be supplied individually with a different one of said voltages, one of said circuits containing a regulatable ohmic resistance and said other circuit a regulatable reactive impedance in order to allow balancing said voltages against each other with respect to magnitude and phase, and means for effecting recordings in dependence upon the positions of said regulatable resistance and impedance.

9. In an arrangement for testing materials by comparing the properties of a specimen of the material with a standard piece of known properties, in combination, a device for subjecting said standard piece and said specimen to oscillatory stresses, means associated with said testing device for producing a voltage in correspondence with the oscillatory deformation of the standard piece and another voltage in correspondence with the oscillatory deformation of the specimen, a balanceable measuring network having two circuits interconnected by a common zero branch, said circuits being connected with said voltage-producing means so as to be supplied individually with a different one of said voltages, a regulatable rheostat arranged in said circuit carrying the voltage corresponding to the oscillations of the specimen, a resistor and a regulatable capacitor parallel connected with each other and arranged in said other circuit, and means for effecting recordings in dependence upon the positions of said regulatable resistance and parallel-connected impedances.

10. In an arrangement for testing materials by determining the properties of a test piece by comparison with a standard piece, in combination, an oscillatory testing machine for simultaneously subjecting said test piece and said standard piece to oscillatory stresses, an electromagnetic device associated with said machine so as to produce an alternating voltage in correspondence with the oscillations of the test piece, a second electromagnetic device associated with said machine so as to produce an alternating voltage in correspondence with the oscillations of the standard piece, a compensating circuit having two main branches and a zero branch, each of said main branches being connected with a different one of said voltage-producing devices, a variable resistance disposed in one of said main branches and a variable reactance disposed in said other main branch for compensating the effect of said two alternating voltages on said zero branch, actuating means connected with said zero branch and mechanically coupled with said variable resistance and said variable reactance for adjusting said resistance and said reactance in the balancing direction in response to the occurrence of an unbalance in said zero branch, and indicating means connected with said variable resistance and said variable reactance for continuously indicating the adjustments of said resistance and said reactance.

11. In an arrangement for testing materials by determining the properties of a test piece by comparison with a standard piece, in combination, a testing machine for simultaneously subjecting said test piece and said standard piece to oscillatory stresses of adjustable magnitude, means associated with said machine for producing an alternating voltage depending upon the speed of deformation of said test piece and means for producing another alternating voltage depending upon the speed of deformation of said standard piece, a compensating circuit having two main branches and a zero branch, each of said main branches being connected with a different one of said voltage-producing means, two impedances connected in said two main branches respectively, one of said impedances being substantially ohmic and said other impedance comprising a reactance for compensating the effect of said two alternating voltages on said zero branch, at least one of said impedances being regulatable, an amplifier having its input terminals connected in said zero branch, a reversible motor electrically connected with the output terminals of said amplifier and mechanically coupled with said regulatable impedance, whereby said impedance is automatically adjusted into balancing position in response to an unbalance occurring in said zero branch and by said position indicates the magnitude to be determined.

12. In an arrangement for testing materials by determining the properties of a test piece by comparison with a standard piece, in combination, a testing machine for simultaneously subjecting said test piece and said standard piece to oscillatory stresses of adjustable magnitude, means associated with said machine for producing an alternating voltage depending upon the speed of deformation of said test piece and means for producing another alternating voltage depending upon the speed of deformation of said standard piece, a compensating circuit having two main branches and a zero branch, each of said main branches being connected with a different one of said voltage-producing devices, a variable resistance disposed in one of said main branches and a variable reactance disposed in said other main branch for compensating the effect of said two alternating voltages on said zero branch, an amplifier having its input terminals connected in said zero branch, two reversible induction meters each having a rotary armature, a current coil and a voltage coil, one of said armatures being mechanically coupled with said resistance and said other armature being mechanically coupled with said reactance in order to regulate said resistance and said reactance respectively, said current coils being connected with the output terminals of said amplifier so as to be energized in accordance with and in dependence upon the direction of an unbalance current flowing in said zero branch, and current supply means for feeding alternating currents of equal frequency to said voltage coils, said supply means being designed to energize said voltage coils by voltage of 90° phase displacement with respect to each other, whereby said impedances are automatically regulated to assume a balancing position so as to continuously indicate the magnitudes of the first-mentioned two voltages as a measure of the properties to be determined.

13. In an arrangement for testing materials by determining the properties of a test piece by comparison with a standard piece, in combination, a testing machine for simultaneously subjecting said test piece and said standard piece to oscillatory stresses, a driving motor for operating said testing machine, a generator for producing two alternating voltages 90° out of phase with respect to each other, said generator being connected with said motor whereby the frequency of said voltages is in proportion to the speed of said motor and the frequency of said oscillatory stresses, means associated with said testing machine for producing an alternating voltage depending upon the speed of deformation of said test piece and means for producing another alternating voltage depending upon the speed of deformation of said standard piece, a compensating circuit having two main branches and a zero branch, each of said main branches containing a regulatable impedance and being connected with a different one of said voltage-producing devices, one of said impedances having a substantially ohmic resistance and said other impedance having a reactive resistance for compensating said alternating voltages as regards said zero branch, an amplifier having its input terminals connected in said zero branch, two reversible induction meters each having a rotary armature, a current coil and a voltage coil, each of said armatures being coupled with a different one of said impedances to regulate said impedance, said current coils being connected with the output terminals of said amplifier so as to be energized in accordance with and in dependence upon the direction of an unbalance current flowing in said zero branch, said voltage coils being connected with said generator so as to be energized with 90° phase displacement with respect to each other, whereby said impedances are automatically regulated to assume a balancing position thus continuously indicating magnitudes forming a measure of the properties to be determined of the test piece.

14. In an arrangement for testing materials by determining the properties of a test piece by comparison with a standard piece, in combination, a testing machine for simultaneously subjecting said test piece and said standard piece to oscillatory stresses of adjustable magnitude, means associated with said machine for producing an alternating voltage depending upon the speed of deformation of said test piece and means for producing another alternating voltage depending upon the speed of deformation of said standard piece, a compensating circuit having two main branches and a zero branch, each of said main branches being connected with a different one of said voltage-producing devices, a variable impedance disposed in each of said main branches, one of said impedances being substantially ohmic and the other substantially reactive for compensating said two voltages as regards said zero branch, an amplifier having its input terminals connected in said zero branch, two reversible induction meters each having a rotary armature, a current coil and a voltage coil, each of said armatures being coupled with a different one of said impedances to regulate said impedance, said current coils being connected with the output terminals of said amplifier so as to be energized in accordance with and in dependence upon the direction of an unbalance current flowing in said zero branch, current supply means connected with said voltage coils so as to energize said voltage coils by voltages of 90° phase displacement with respect to each other, said current supply means being electrically connected with said testing machine so that the frequency of said latter voltages remains in a given proportion to the frequency of said oscillatory stresses, and means for recording the varying balancing position of said impedances.

15. An oscillatory testing device for determining fatigue properties of elongated test pieces in comparison to an elongated standard piece of known properties, comprising in combination an intermediate member for firmly and coaxially connecting said test piece and said standard piece with each other so as to form a series arrangement, means for firmly clamping one end of said series arrangement, adjustable driving means for imposing oscillatory and deforming stresses on the other end of said series arrangement, means for producing a measuring magnitude corresponding to the deformation of said test piece caused by said stresses and another measuring magnitude corresponding to the deformation of said standard piece, and recording means connected with said latter means for recording said two measuring magnitudes.

16. An oscillatory testing device for determining fatigue properties of elongated test pieces in comparison to an elongated standard piece of known properties, comprising in combination an intermediate member for firmly and coaxially connecting said test piece and said standard piece with each other so as to form a series arrangement, means for firmly clamping one end of said series arrangement, adjustable driving means for imposing oscillatory stresses on the other end of said series arrangement, two electromagnetic voltage producers each comprising two cooperative elements movable relatively to each other and consisting of a coil and a magnetized armature, each of said voltage producers having one of its elements mounted on said intermediate member, said second element of one of said voltage producers being stationary and said second element of said other voltage producer being arranged so as to move together with the end of said series arrangement stressed by said driving means, and electric recording means connected with said coils so as to be responsive to the voltages of said voltage producers.

17. An oscillatory device for testing materials, comprising in combination a machine for subjecting a specimen to oscillatory stresses of adjustable magnitude, means associated with said machine for producing an electric magnitude corresponding to the deformation of the specimen caused by said stresses, a temperature-responsive device for producing another electric magnitude corresponding to the temperature of the specimen caused by said stresses, and indicating means connected with said electric means and said temperature-responsive device for effecting a continuous indication during the testing period in response to said electric magnitudes.

18. An oscillatory device for testing materials, comprising in combination a machine for subjecting a specimen to oscillatory stresses, said machine including control means for varying the magnitude of said stresses while performing the testing operation, measuring means associated with said machine and responsive to the magnitude of said stresses, thermic means for determining the heat developed in the specimen by said stresses, and an indicating system connected with said measuring means and said thermic means for continuously indicating a magnitude corresponding to the heat in said specimen in relation to the stresses acting upon said specimen.

19. An arrangement for the fatigue-testing of materials on a short-time principle, comprising a testing device having a fixed and a movable abutment for a specimen to be tested, an oscillatory load-applying device connected with said movable abutment for imparting oscillatory stresses to the specimen, control means associated with said load-applying device for gradually varying, during the operation of said latter device, the magnitude of said stresses within a range below the yield point of the material, and measuring means connected with said testing device for recording determinants of the elasticity and internal energy loss of the specimen simultaneously with said magnitude variation of said oscillatory stresses.

20. An arrangement for the fatigue-testing of materials on a short-time principle, comprising a testing device having a fixed and a movable abutment for a specimen to be tested, an oscillatory load-applying device connected with said movable abutment for imparting oscillatory stresses to the specimen, control means associated with said load-applying device for varying, during the operation of said latter device, the amplitude of said oscillatory stresses in accordance with a given characteristic and up to a maximum value below the limit of permanent deformation, and measuring means connected with said testing device for recording at least one determinant of the elastic properties of the specimen in dependence upon said amplitude variation.

21. The method of effecting short-time tests for determining fatigue properties of materials, comprising the steps of subjecting a specimen of the material to an oscillatory load so as to stress the elasticity and to produce an internal energy loss in said specimen, gradually varying, during a continuous sequence of oscillations, the amplitude of the oscillations in accordance with a given characteristic and within a range below the limit of permanent deformation, and continuously measuring, during the duration of said amplitude variation, the effect of said variation on the elasticity and internal loss of the material to obtain curves characteristic of the fatigue properties to be determined.

22. The method of effecting short-time tests for determining fatigue properties of materials, comprising the steps of subjecting a specimen of the material to an oscillatory load so as to stress the elasticity and to produce an internal energy loss in said specimen, gradually varying during a continuous sequence of oscillations the amplitude of the oscillations in accordance with a given characteristic and exclusively within a range below a predetermined limit lying safely below the value of permanent deformation required of the material, producing two electrical magnitudes corresponding to the energy loss and the stress in the specimen, respectively, and measuring the change of said electrical magnitudes during said amplitude variation.

23. An arrangement for the fatigue-testing of materials on a short-time principle, comprising a device for electromagnetically imparting oscillatory stresses to a specimen of the material to be tested, an alternating current source for energizing said device, control means connected between said current source and said device for varying the energization of said device effected by said current source, a motor also connected with said current source, an operative connection between said motor and said control means for causing the latter to gradually increase the magnitude of the stress imparted to said specimen, means for opening the connection between said motor and said current source upon said magnitude reaching a predetermined maximum value below the expected limit of permanent deformation, and means controlled by the specimen for measuring the elasticity and internal energy loss of the specimen during the operation of said control means.

24. The method of testing materials, which comprises subjecting a standard piece of known properties and a specimen to be tested simultaneously to a torsional and oscillatory load of a magnitude remaining below the limit of damage to the standard piece, measuring the amplitudes of the deformations of the standard piece and the specimen, respectively, caused by said load, and comparing the measuring results with each other to determine the departure of the deformations of the specimen from those of the standard piece as a determinant of the comparative frictional internal energy loss in the specimen.

25. The method of fatigue testing materials, which comprises subjecting a standard piece to a torsional and oscillatory load of a magnitude below the limit of damage and determining the dependence of the deformations of the standard piece on said load, subjecting a specimen of the material to be tested to substantially the same load and determining the dependence of its deformations on the load, and determining the departure of the test results obtained with said specimen from the results obtained with said standard piece as a measure of the comparative energy losses in said specimen.

GEORGE KEINATH.